United States Patent [19]

Howard et al.

[11] 4,053,416
[45] Oct. 11, 1977

[54] FILTER PRESS ASSEMBLY

[75] Inventors: Laurence M. Howard, Cresskill, N.J.; Robert Schaaf, Brooklyn, N.Y.

[73] Assignee: Air Filters, Inc., Brooklyn, N.Y.

[21] Appl. No.: 722,549

[22] Filed: Sept. 13, 1976

[51] Int. Cl.² .............................................. B01D 25/00
[52] U.S. Cl. ...................................... 210/227; 29/235; 29/451; 29/469; 55/377; 210/230; 210/483; 210/541; 285/20; 285/177
[58] Field of Search ................. 210/65, 224, 227, 228, 210/229, 230, 231, 232, 79, 483, 484, 486; 55/377; 285/19, 177, 20, 200, 292; 100/297, 298, 299; 29/235, 469, 451

[56] References Cited

U.S. PATENT DOCUMENTS

| | | | |
|---|---|---|---|
| 772,132 | 10/1904 | Crossley | 210/231 |
| 1,316,465 | 9/1919 | Stone | 210/227 |
| 1,801,933 | 4/1931 | Ouss | 210/231 |
| 3,463,691 | 8/1969 | Martin | 285/292 |
| 3,495,386 | 2/1970 | Bixler et al. | 55/377 X |
| 3,543,938 | 12/1970 | Busse et al. | 210/231 |
| 3,888,769 | 6/1975 | Schoron | 210/227 |
| Re. 22,782 | 8/1946 | Rembert | 285/292 |

Primary Examiner—Theodore A. Granger
Attorney, Agent, or Firm—Friedman, Goodman & Teitelbaum

[57] ABSTRACT

A filter press having a number of filter plates, each of which includes a center hole, with a filter cloth hanging over each filter plate. The filter cloths include a corresponding center hole, and a flexible coupling member having a tubular stem with a flanged base, wherein the flanged base is positioned around the hole on one side of the cloth. The tubular stems are inserted within a coupling cylinder which is positioned within the hole of the filter plate. A method is described for hanging the filter cloths onto the filter plate by inserting one of the stems into one end of the coupling cylinder, and then inserting the cylinder into the hole in the filter plate. A tool is then used to reverse the stem of the coupling member of another filter cloth, and then the same tool is removed permitting the restoration of the stem while positioning it within the other end of the coupling cylinder.

9 Claims, 5 Drawing Figures

FILTER PRESS ASSEMBLY

BACKGROUND OF THE INVENTION

This invention relates to a filter press and more particularly to a filter plate with a filter cloth hanging thereon, and a method for assembling the filter cloth onto the filter plate.

Filter presses are well known as a type of pressure filter, and is especially used for liquid-solid separation. Such presses include a series of filter plates which are compressed together between two heads. Hung over each plate is a filter cloth which covers all the filter areas. Typically, each plate includes a center hole and has channels along its surface. The sludge can enter through the center hole, pass through the spaces between the plates, and then enter the plates through the filter cloth to leave through a corner of each frame. The filtrate output passes out of the corner and is collected. As the filtrate passes through the press, a cake is formed in the spaces between adjacent plates. When the filter press is full of the solid cake material, the filtration is stopped, the plates released by releasing the pressure against the heads, sliding them apart, and the cake is removed. The filter cloth can then be removed for washing or replacement.

In the type of presses using filter plates with a center hole therein, it is necessary for the filter cloth to pass through the center hole of the plate and cover both sides of the plate. Generally, filter cloths are available as a single unit having two sides, with an interconnected center hole consisting of a tubular section. The two sides of the filter cloth are usually made of a unitary construction and is typically sewn together. To hang the filter cloth over the filter plate is a very difficult task. Usually, one side of the filter cloth is folded and compressed so that it can be squeezed through the center hole of the filter plate and is then pushed and squeezed through the center hole to the other side of the filter plate. Once on the other side of the center hole, it is again opened up to cover the other side of the filter plate. However, it is a most difficult and time consuming task, especially when it is necessary to continuously change the filter cloth for replacement or cleaning. Such constant manipulation becomes most awkward.

SUMMARY OF THE INVENTION

It is accordingly an object of the present invention to provide an improved filter cloth which avoids the aforementioned problems of prior art devices.

Another object of the present invention is to provide an improved filter cloth with a simplified assembly of hanging the filter cloth on a filter plate.

Still a further object of the present invention is to provide an improved method of hanging filter cloths on filter plates having center holes.

Yet a further object of the present invention is to provide an improved filter cloth for easy assembly onto a filter plate with a center hole.

Yet another object of the present invention is to provide an improved assembly of a filter plate with filter cloths hanging thereon.

Briefly, the invention describes a method of hanging a filter cloth over the filter plate of a filter press, wherein the filter plate has a center hole. The method includes the steps of selecting two independent and substantially identical sections of a filter cloth. Each of the sections contains a flexible coupling member having a tubular stem with a flanged base. The flanged base is secured to one side of the cloth and surrounds a hole in the cloth which corresponds to the hole in the filter plate. A first one of the cloths has its tubular stem inserted into one end of a coupling cylinder. The coupling cylinder is then inserted into the hole of the filter plate. The tubular stem of the other filter cloth is then adjusted into the other end of the coupling cylinder. The two cloths can then be closed around the filter cloth by conventional means.

In order to adjust the tubular stem of the other cloth into the coupling cylinder, a tool is utilized. The tool contains a cylindrical shaft with an enlarged head. The enlarged head of the tool is inserted into the mouth of the tubular stem. By pushing on the tool the enlarged head reverses the tubular stem and positions the stem about the shaft of the tool. The end of the shaft of the tool still extends from the one side of the cloth. The end of the tool is then located into the coupling cylinder. The tool is then removed by pulling on the head, so that the stem can restore to its original position while being located within the coupling cylinder.

The invention also describes an assembled filter press including at least one filter plate having the filter cloth hanging on it, wherein the filter cloth includes a coupling member having a tubular stem with a flanged base, the flanged base being connected on one side of the cloth around a hole of the cloth corresponding to the hole in the filter plate. The tubular stem of the filter cloth is inserted within a coupling cylinder which is in turn inserted into the center hole of the filter plate.

Also described in the invention is a filter cloth of the type described for hanging over a filter plate of a filter press.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENTS

Figure 1:
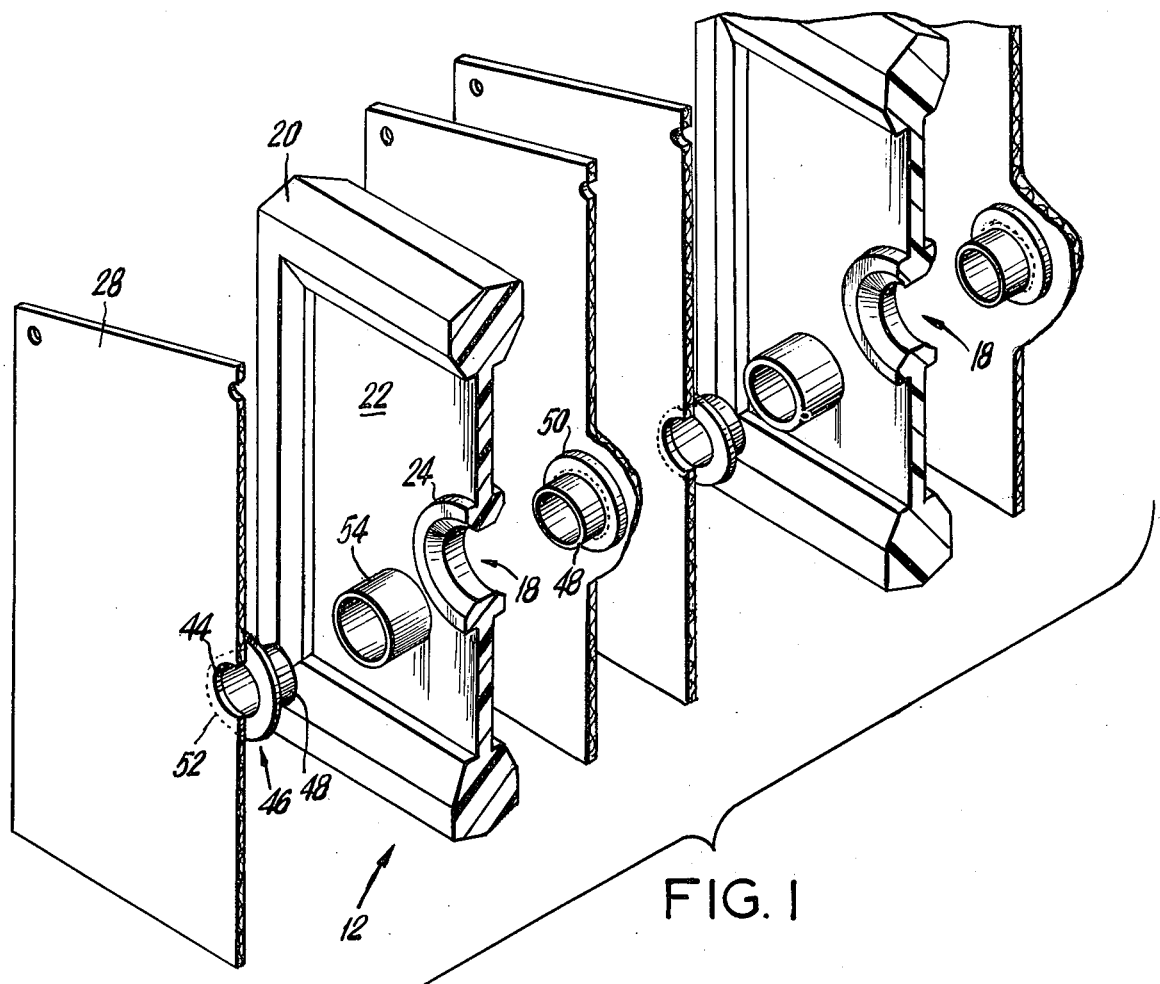
FIG. 1 is an exploded sectional view taken through the center of a filter press and including some filter plates with their accompanying filter cloths.
Figure 2:
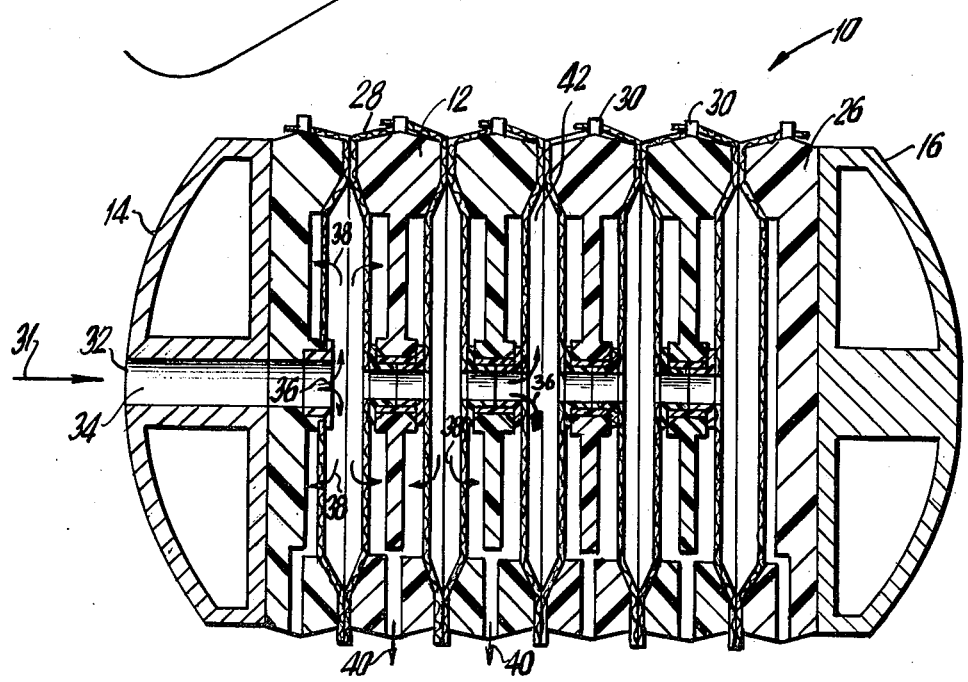
FIG. 2 is a sectional elevational view of a filter press.

Referring now to FIGS. 1 and 2 there is shown generally a filter press 10 including a plurality of filter plates 12 held together between a first head 14 and a second head 16. One of the heads is typically a fixed head while the other is a movable head. Pressure can be applied onto the movable head to compress the filter plates together. Each of the filter plates includes a center hole 18. Each filter plate includes an outer frame 20 with a thinner inner section 22 and a circular hub 24 around the center hole 18. The end plate 26 is shown to be without a center hole. Positioned around each of the filter plates is a filter cloth 28 which is so arranged as to cover all of the filter areas. The filter cloths are hung over the filter plates 22 and are fastened at the top by means of clips 30, or other fastening means. The compression of the heads, forcing each of the plates against each other, holds the filter cloths tight against the frames of the plates and utilizes the cloths as a gasket preventing leakage of any of the fluid from the filter press.

In one use of the filter press, the sludge enters at the inlet shown by the arrow 31, through the center of one of the heads 14 at 32. The fluid then passes through the center passage 34 and continues passing in between adjacent plates as shown by the arrows 36. It then passes through the filter cloth, as shown by the arrows 38, and finally leaves through the filter outlet 40 shown at the bottom of each filter plate.

As the sludge passes through the filter press, a cake is formed between adjacent plates in the area 42. When the cake builds up too excessively, the filter press is opened by removing the pressure against the head thereby separating each of the filter plates. The cake is then removed from adjacent filter plates. The filter cloths covering the filter plates must be removed for cleaning or replacement.

It can therefore be seen that the hanging of the filter cloths over the filter plates becomes an important aspect of maintenance of the press. It is therefore important to provide a simplified means of hanging such filter cloths over the filter plates, and easily removing and replacing them.

In the prior art, the filter cloths were made of a unitary construction for each filter plate. The filter cloths included two interconnected sections, each with a center hole and a section interconnecting the center hole. It was therefore necessary to have one of the cloths folded and inserted within the hole of the filter plate to pass it through the hole to the other side of the filter plate in order to cover both sides of the filter plate.

The filter cloths of the present invention are formed of independent sections for each filter plate. The sections, however, are substantially identical. Each section includes a center hole 44. Positioned on one side of the filter cloth is a coupling member 46 including a tubular stem 48 extending from one side of the filter cloth and a flanged base 50 which is positioned around the hole in the cloth. It is noted that the coupling member 46 is attached to one side of the filter cloth, while the other side of the filter cloth is substantially flat. The attachment can be made by any known means such as by stitching 52. Other fastening can similarly be used. A coupling cylinder 54 is utilized to interconnect adjacent coupling members 46 on either side of a filter plate.

In assembling the filter press, each filter plate has a couping cylinder 54 positioned in its center hole 18. Typically the outside diameter of the cylinder 54 will be slightly less than the inside diameter of the hole 18 to permit easy assembly of the coupling cylinder into the hole. The length of the coupling cylinder 54 will be approximately the same length as the length of the hole 18 in the plate.

The coupling member 46 of one section of filter cloth, will have its stem 48 inserted in one side of the cylinder 54 and will hang over one side of the filter plate. Another section of the filter cloth will have its coupling member 46 adjusted so that its stem 48 will be inserted into the other end of the coupling cylinder 54, and will hang over the other side of the filter plate. The edges of the filter cloth can then be properly closed around the outside of the frame 20 of the filter plate, as is conventional in the art.

The outside diameter of the stems 48 are made substantially equal to the inside diameter of the coupling cylinder 54 to provide a very tight fit of the two stems into the cylinder 54 and thereby prevent the filter cloths from loosening from their respective plates during the course of the filtering operation.

By forming the filter cloths in two separate sections, each with a coupling member connected to a separate coupling cylinder, it is possible to easily assemble the filter cloths and easily remove the filter cloths from each filter plate without having to squeeze and compress any part of the cloths. All that is necessary is to have each stem inserted into opposite ends of the coupling cylinder on either side of a filter plate.

Figure 3:
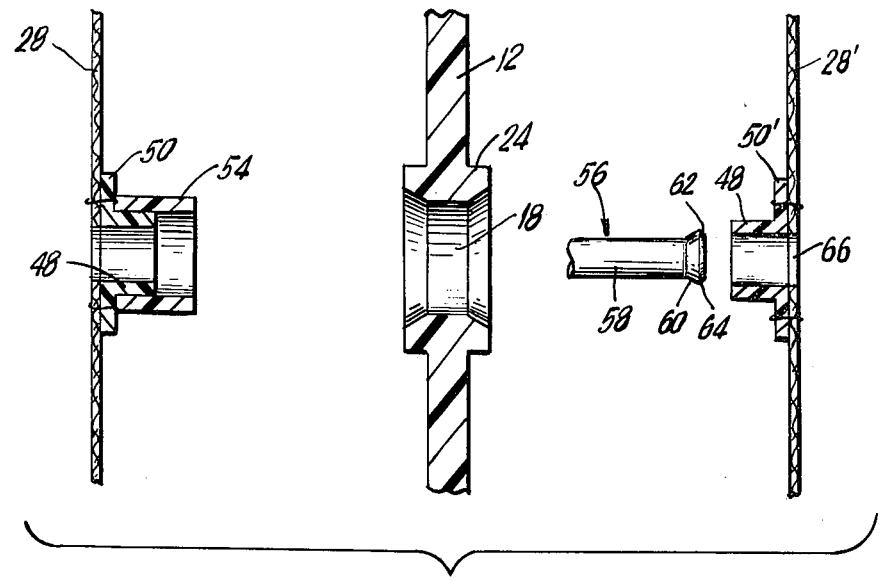
FIGS. 3, 4 and 5 show exploded sectional views of the various steps in the method of hanging the filter cloth on the filter plate, in accordance with the present invention.

In order to assemble the filter cloths on both sides of the filter plate, a method will now be described utilizing a tool to facilitate such assembly. Referring now to FIG. 3 there is shown the filter plate 12 with the hub 24 around the center hole 18. A first filter cloth 28 is available for hanging over one side of the filter plate and a second filter cloth 28' is available for hanging over the other side. In the first stage of assembly the stem 48 of the first filter cloth 28 is inserted into one end of the coupling cylinder 54. Although the outside diameter of the stem is equal to the inside diameter of the cylinder 54, the stem is made of flexible material, such as relatively hard rubber. Since the assembly of the stem 48 into the cylinder 54 is done away from the filter plate, the stem can be manipulated and bent without too much difficult to achieve proper insertion. However, the problem is how to insert the stem 48' of the other filter cloth 28' into the other end of the cylinder 54. If such an insertion is done before the cylinder 54 is put into the hole 18 of the filter plate 12, then it can no longer be placed on both sides of the filter plate. Therefore, it is necessary to first insert the cylinder 54 into the filter plate. However, it now becomes very difficult to manipulate the stem 48' into the cylinder 54 since the cylinder 54 is now held in place inside the filter plate 12 and it is difficult to manipulate.

In order to facilitate such insertion, the tool 56 is provided. The tool 56 includes a cylindrical shaft 58 which outwardly tapers at 60 to an enlarged head 62 which includes a cylindrical ridge 64, and the head then tapers inwardly again. The outside diameter of the shaft 58 is made smaller than the inside diameter of the tubular stem 48'. However, the outside diameter of the ridge 64 is slightly larger than the inside diameter of the tubular stem 48'.

The enlarged head 64 of the tool 56 is inserted into the mouth of the tubular stem 48' and is pushed against the mouth. In so doing, the stem 48' will be forced inwardly, passing through the hole in the filter cloth, and will be reversed so that the stem now extends through the other side of the filter cloth 28'.

Figure 4:
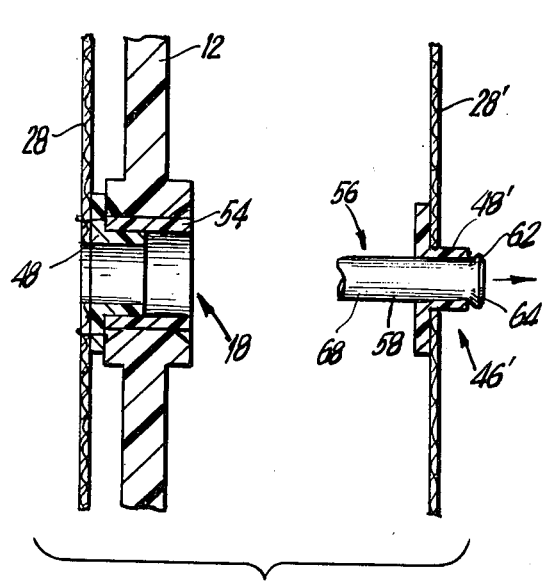

As shown in FIG. 4, the cylinder 54 has been inserted into the hole 18 of the filter plate 12. The previously inserted stem 28 is already in place in the one end of the cylinder 54 and the filter cloth 28 is already positioned to cover one side of the filter plate 12. The tool 56 has been pushed through the coupling member 46' of the filter cloth 28' so that the stem 48' is now extending from the other side of the filter cloth 28' and is positioned on the cylindrical shaft 58. It should be noted, that although the tool 56 has been pushed through, the end portion 68 of the tool still extends from the first side of the filter cloth 28'.

Figure 5:
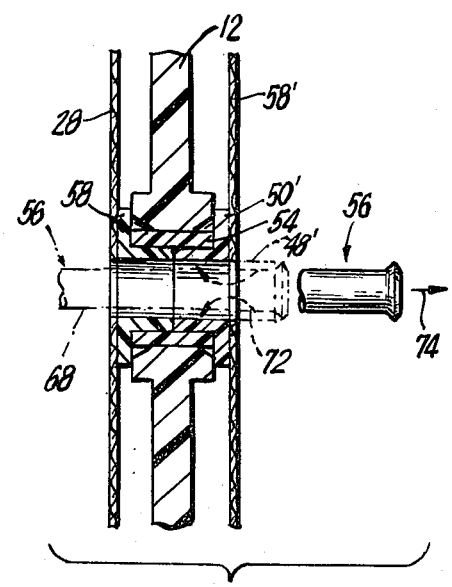

Referring now to FIG. 5 the end 68 of the tool 56 is then inserted into the cylinder 54. The enlarged head 64 is then removed by pulling it in the direction shown by the arrow 74. In so pulling, the tool is removed and the stem 48' can now be restored to its original facing position. With such restoring, it also is place within the cylinder 54. Because of its resiliency and flexibility, the stem 48' will quickly snap back to its original position and will easily be placed within the cylinder, as desired.

The dotted lines in FIG. 5 show the position of the tool as it is located within the coupling cylinder 54 prior to its removal. The arrows 72 show the reversing movement of the stem 48' as it restores to its original facing position.

In order to facilitate the operation of the tool, it should be noted that the sides of the ridge 62 are tapered to engage the mouth of the stem as it is pushed to reverse the stem.

Once the filter cloths have been properly hung on both sides of the plates, the plates can be assembled and the ends of the filter cloths will be positioned around the outer frame of the filter plate and held in place by conventional means. Typically the shape of the filter cloth will correspond to the shape of the filter plate.

Numerous alterations of the structure herein disclosed will suggest themselves to those skilled in the art. However, it is to be understood that the present disclosure relates to a preferred embodiment of the invention which is for purposes of illustration only and is not be construed as a limitation of the invention.

What is claimed is:

1. A method of hanging a filter cloth over the filter plate of a filter press, the filter plate having a center hole, the method comprising the steps of:
    a. selecting two sections of a filter cloth, each section containing a flexible coupling member having a tubular stem with a flanged base, the flanged base being secured to one side of the cloth and defining a hole in the cloth corresponding to a hole in the filter plate;
    b. fitting the tubular stem of one of the cloths into one end of a coupling cylinder;
    c. inserting the other end of the coupling cylinder through the hole in the filter plate;
    d. adjusting the tubular stem of the other cloth into the other end of the coupling cylinder, said step of adjusting including:
        1. reversing the tubular stem such that it passes through the hole in the cloth and extends from the other side of the cloth;
        2. positioning the flanged base adjacent the other end of the coupling cylinder; and
        3. restoring the tubular stem to its original position and thereby locating it within the coupling cylinder; and
    e. closing the two cloths around the filter plate.

2. A method as in claim 1 and wherein said step of reversing the tubular stem includes the steps of:
    a. inserting into the mouth of the tubular stem a tool with a cylindrical shaft and an enlarged head;
    b. pushing on the tool such that the enlarged head reverses the tubular stem while positioning it about the shaft of the tool, the end of the shaft of the tool extending from said one side of the cloth;
    wherein said step of positioning further includes the steps of:
    c. inserting the end of the shaft into said other end of said coupling cylinder, and
    wherein said step of restoring includes the step of:
    d. pulling on the head of the shaft to remove the tool whereby the stem will be restored to its original facing position while being located within the coupling cylinder.

3. A method as in claim 1 and wherein the outside diameter of the tubular stem is formed in size approximately the same as the inner diameter of the coupling cylinder to provide a tight fit between the stems and the coupling cylinder.

4. A method as in claim 1 and wherein the outside diameter of the coupling cylinder is formed less than the diameter of the center hole in the filter plate.

5. A method as in claim 2 and wherein the outside diameter of the shaft of the tool is formed less than the inside diameter of the tubular stem, and wherein the enlarged head is formed with a circular ridge whose outside diameter is formed slightly larger than the inside diameter of the tubular stem.

6. A method as in claim 5 and wherein the tool shaft is formed outwardly tapered toward the circular ridge.

7. A method as in claim 1 and further comprising the steps of combining a plurality of filter plates with filter cloths hung over them into a group, and forming them into a filter press.

8. A filter press comprising at least one filter plate having a center aperture, a coupling cylinder positioned within said center aperture of said filter plate, first and second sections of filter cloth hanging on opposite sides of said filter plate, each section of said filter cloth having a center hole corresponding to said aperture of said filter plate, each filter cloth including a coupling member having a tubular stem with a flanged base, said flanged base being disposed around said hole in said cloth and connected on one side of said cloth facing said filter plate, said tubular stems being inserted within said coupling cylinder in a facing relationship with each other, outside diameters of said tubular stems being approximately equal to an inside diameter of said coupling cylinder to provide a tight fit therebetween, length of said coupling cylinder being approximately equal to length of said center aperture of said filter plate with said flanged bases being disposed against opposite ends of said coupling cylinder and against said opposite sides of said filter plate, and each of said tubular stems including flexible means for permitting said tubular stem to be reversed through said hole of said cloth into a mounting position with said tubular stem facing away from said filter plate and also for restoring said tubular stem to its original position when inserting at least one of said tubular stems into said coupling cylinder.

9. A filter cloth for hanging over a plate of a filter press, said filter cloth comprising a center hole adapted to correspond to a center aperture of the plate, said filter cloth including a coupling member having a tubular stem with a flanged base, said flanged base being disposed around said hole in said cloth and connected on one side of said cloth adapted to face the plate so that said tubular stem can be inserted into the center aperture of the plate, said tubular stem in its original position being disposed perpendicular to said flanged base and extending in a normal direction away from said hole in said cloth, said tubular stem including flexible means for permitting said tubular stem to be reversed through said hole of said cloth into a mounting position with said tubular stem extending normally outwardly from the opposite side of said cloth and also for restoring said tubular stem to said original position when inserting said tubular stem into the center aperture of the plate.

* * * * *